(12) United States Patent
Takatori

(10) Patent No.: US 6,504,651 B1
(45) Date of Patent: Jan. 7, 2003

(54) LIGHT MODULATOR, LIGHT SOURCE USING THE LIGHT MODULATOR, DISPLAY APPARATUS USING THE LIGHT MODULATOR, AND METHOD FOR DRIVING THE LIGHT MODULATOR

(75) Inventor: Ken-ichi Takatori, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/570,354

(22) Filed: May 12, 2000

(30) Foreign Application Priority Data

May 14, 1999 (JP) .............................................. 11-33585

(51) Int. Cl.$^7$ ................................................ G02F 1/03
(52) U.S. Cl. ...................... 359/640; 359/245; 359/247; 359/250; 359/263; 359/638
(58) Field of Search ................................. 359/245, 247, 359/250, 263, 638, 640

(56) References Cited

U.S. PATENT DOCUMENTS

| | | | | |
|---|---|---|---|---|
| 4,451,123 A | * | 5/1984 | McNeill et al. | 359/263 |
| 5,075,796 A | * | 12/1991 | Schildkraut et al. | 252/583 |
| 5,115,336 A | * | 5/1992 | Schildkraut et al. | 359/245 |
| 5,155,617 A | * | 10/1992 | Solgaard et al. | 359/245 |
| 5,157,541 A | * | 10/1992 | Schildkraut et al. | 359/245 |
| 5,451,980 A | | 9/1995 | Simon et al. | 315/88 |
| 5,570,139 A | * | 10/1996 | Wang | 345/84 |
| 6,034,809 A | * | 3/2000 | Anemogiannis | 359/245 |
| 6,040,936 A | * | 3/2000 | Kim et al. | 359/245 |

FOREIGN PATENT DOCUMENTS

JP  5-313108  11/1993  ........... G02F/1/015

OTHER PUBLICATIONS

"Surface Plasmon High Efficeincy Projection Display" Wang SPIE vol. 3019 pp. 35–40.
"Color Liquid DCrystal Display" Kobayashi Dec. 14, 1990 pp. 115–124.
"Monthly Published Display" Jul. issue; 1998 pp. 11–16.

* cited by examiner

Primary Examiner—Bipin Shalwala
Assistant Examiner—Vincent E. Kovalick
(74) Attorney, Agent, or Firm—Hayes Soloway P.C.

(57) ABSTRACT

A light modulator is comprised of two unit devices each using surface plasmon generated at the interface between thin metal films respectively formed on prisms and an electro-optical material, and a mirror. Both of the transmitted light due to absorption and re-radiation, and the reflected light arising from the unit devices are made into the outgoing light, the incident light on the next unit device, or the incident light on the mirror. Consequently, all light beams can be utilized as the final outgoing light beams with no loss of light. Further, the color of light can be spatially divided, and still further, it can also be temporally divided by changing the wavelength due to a voltage. As a result, the original light can be divided both temporally and spatially with almost no loss by combining two unit devices so configured as to re-radiate the absorbed light by surface plasmon using surface plasmon and a mirror, and thus utilizing both of the reflected light and the transmitted light.

11 Claims, 15 Drawing Sheets

POSITION ON SPATIAL DIVISION

POSITION ON SPATIAL DIVISION

LIGHT MODULATOR, LIGHT SOURCE USING THE LIGHT MODULATOR, DISPLAY APPARATUS USING THE LIGHT MODULATOR, AND METHOD FOR DRIVING THE LIGHT MODULATOR

BACKGROUND OF THE INVENTION

1. Field of the Invention

The present invention relates to a light modulator. More particularly, it relates to a light modulator utilizing surface plasmon, a light source and a display apparatus using the light modulator, and a method for driving the light modulator.

2. Description of the Related Art

As a conventional display apparatus, especially, a field sequential display apparatus, there is disclosed an apparatus using a color filter disk (eg., "Color Liquid Crystal Display" written and edited by Shunsuke Kobayashi: published in Dec. 14, 1990, P.117) With this apparatus, a color filter disc colored in red, green, and blue, i.e., three primary colors of light is placed in front of a monochrome cathode ray tube, and rotates in synchronism with display to enable color display. Similarly, color display is also possible even by placing the color filter disc in front of a white light source, and combining a black shutter (black-and-white shutter type display device) therewith.

Further, as an apparatus of another system, on pages 120 and 121 of the aforesaid document "Color Liquid Crystal Display", there is shown an apparatus for performing field sequential color display by combining two high-speed liquid crystal display devices referred to as π cells, and a total of three sheet polarizers and color sheet polarizers in front of a monochrome CRT(cathode ray tube).

Further, there is also shown the technology using a CRT, LED (light emitting diode), or cold cathode fluorescent tube as a backlight, and using a liquid crystal display as a black shutter on pages 122 and 123 in the document "Color Liquid Crystal Display". With this apparatus, backlights of respective three primary colors are prepared so as to alternately flash. One example thereof is shown as a field sequential full color LCD in "Monthly Published Display", the July issue, pp.11–16, (1998). In this example, the cold cathode fluorescence tube backlight which is illumination light of commonly used liquid crystal display apparatus is temporally switched among red, green, and blue.

In recent years, there are proposed a light modulator utilizing an electromagnetic wave supported by the interface between a metal and an insulator (a dielectric material) referred to as a surface plasmon wave (SPW), a display apparatus which permits color display by utilizing this light modulator, and a light source thereof as a display apparatus whereby color display is implemented without using the foregoing color filter and color light source. That is, conductors such as metals can be defined as a gas of electrons in electrostatic equilibrium inside a continuum of positive fixed charges. It can be considered as a "condensed" electron plasma with electron density approximately equal to $10^{23}$ electrons per $cm^3$. There exists a longitudinal wave referred to as a surface plasma oscillation in addition to a volume plasma oscillation which is a normal plasma oscillation. The electric field due to the surface plasma oscillation has a periodic wave form in a direction parallel to the metal surface, while having a form of evanescent wave which evanesces exponentially in a direction perpendicular to the metal surface. Plasmons are quanta associated with the plasma oscillation (collective wave excitation of a conductive electronic gas) in the metal. Because of high electron density, quantum effects dominate. The surface plasmon waves can be optically excited by resonant coupling. The condition for resonance is strongly dependent on the refractive indices and thickness of the media near the metal-insulator interface. The intensity of the light wave can be modulated by coupling the light wave with the surface plasmon wave. Generally, if coupling between the surface plasmon wave and the light wave is strong, the attenuation of the emitted light wave is strong, and if coupling is weak, there occurs almost no attenuation of the emitted light wave.

Attenuated total reflection (ATR) effect has been utilized to optically excite surface plasmon waves through a high-index prism. Light, traveling in free-space, is sent toward the metal-insulator interface through the prism with an angle larger than the critical angle, producing an evanescent wave field which may overlap the surface plasmon wave field. If the propagation constant Kev of the evanescent wave is in harmony with the propagation constant Ksp of the surface plasmon, the surface plasmon resonance is excited on the metal surface. Two configurations are mainly used for optically exciting the surface plasmon wave. The first is Otto's ATR configuration. This Otto's configuration is shown in FIG. 1A. In this Otto's configuration, there exists a small air gap between a metal medium layer 101 stacked on a thick insulator 102 and a high-index prism 103. A surface plasmon wave 105 is optically excited by the incident light. Further, the second configuration used to optically excite surface plasmon waves is Kretschmann's modified ATR configuration as shown in FIG. 1B. In this configuration, a thin metallic foil 101 is inserted between the prism 103 and the insulator 102. Surface plasmon waves 105 are also optically excited by absorbed light which will not be reflected light 106. This configuration is more practical since there is no air gap. It is noted that the high-index prism 103 for generating the evanescent wave may be a diffraction grating with a period smaller than the wavelength of the incident light, or other optical components.

Here, when a prism is used as an optical component, the propagation constant (wave number) Kev of the evanescent wave is represented by the following equation (1):

$$K_{ev} = n(\omega) \cdot K_0(\omega) \cdot \sin\theta \quad\quad (1)$$
$$= n(\omega) \cdot \omega/c \cdot \sin\theta$$
$$= n(\lambda) \cdot 2\pi/\lambda \cdot \sin\theta$$

where c is the speed of light in vacuum, ω is the angular frequency, λ is the wavelength, n(ω) and n(λ) are the refractive indices of the prism in the case of an angular frequency ω and a wavelength λ, respectively, $K_0(\omega)$ is the wave number in the case of an angular frequency ω) in vacuum, and θ is the incident angle of light with respect to the underside of the prism. Therefore, the wave number of the evanescent waves can be harmonized with the propagation constant of the metal surface plasmon by adjusting the refractive index n(ω) or n(λ) of the prism and the incident angle θ of light.

On the other hand, the propagation constant Ksp of the surface plasmon is given by the following equation 2, where the angular frequency of the surface plasmon is ω, and the dielectric indices of the metal and the dielectric indices of the low-index medium in contact with the metal are respectively ∈m and ∈0, $$k_{sp} = \frac{\omega}{c} \cdot \sqrt{\frac{\varepsilon_m(\omega) \cdot \varepsilon_0}{\varepsilon_m(\omega) + \varepsilon_0}} \quad (2)$$

$$= \frac{2\pi}{\lambda} \cdot \sqrt{\frac{\varepsilon_m(\lambda) \cdot \varepsilon_0}{\varepsilon_m(\lambda) + \varepsilon_0}}$$

where the $\in m(\omega)$ and $\in 0(\omega)$ are the dielectric indices of the metal in the case of the angular frequency $\omega$ and the wavelength $\lambda$, respectively. Here, since the $\in m$ is a complex number, the propagation constant Ksp is also a complex number. The evanescent waves generated by using a prism when Kev=Ksp generates the surface plasmon. In order to strongly excite the metal surface plasmon, the metal surface plasmon itself must be a wave with a long life. That is, it is required that the imaginary part of the propagation constant Ksp is small, and the attenuation associated with propagation is small.

The imaginary part of the propagation constant Ksp is approximatively solved, assuming that respective complex numbers are Ksp=Ksp'+iKsp", and $\in m=\in m'+i\in m"$ (the $\in$ to be precise, depends on the angular frequency or the wavelength), yielding the following expression 3:

$$k_{sp}'' \approx \frac{\omega}{c} \cdot \left(\frac{\varepsilon_m(\omega)' \cdot \varepsilon_0}{\varepsilon_m(\omega)' + \varepsilon_0}\right)^{3R} \times \frac{\varepsilon_m(\omega)''}{2(\varepsilon_m(\omega)')^2} \quad (3)$$

$$\approx \frac{2\pi}{\lambda} \cdot \left(\frac{\varepsilon_m(\lambda)' \cdot \varepsilon_0}{\varepsilon_m(\lambda)' + \varepsilon_0}\right)^{3R} \times \frac{\varepsilon_m(\lambda)''}{2(\varepsilon_m(\lambda)')^2}$$

Therefore, the factor which decides the intensity of the metal surface plasmon is $\in m"/(\in m')_2$ (the $\in$, to be precise, depends on the angular frequency or the wavelength), and the metal to excite the metal surface plasmon is desirably a metal whose value of $|\in m"/(\in m')_2|$ is small. Specifically, silver (Ag), gold (Au), copper (Cu), aluminum (Al) and the like are usable.

There are proposed a liquid crystal display device (U.S. Pat. No. 5,451,980), and a projector (U.S. Pat. No. 5,570,139), each of which selects a wavelength based on an electric field using a material whose refractive index varies with the application of electric field such as a liquid crystal as a low-index dielectric to perform display utilizing surface plasmon. The example of the publication of the device in the academic meeting is shown in "Appl. Phys. Lett.", U.S., 1995, vol. 67, the 19 th number, pp. 2759 to 2761. In this reference, as shown in FIG. 2A, there is illustrated a device whereby the absorption wavelength is made variable, and the wavelength region of the reflected light is electrically changed using a liquid crystal. Further, FIG. 2B shows the measurements (a broken curve) and the calculated results (solid curve) of the characteristics of the reflected light intensity with respect to wavelengths when the voltage value in the aforesaid device is varied. In the device, a 60° $SF_6$ glass prism is used as a prism 103, and a 50-nm silver thin film is evaporated thereon as a thin metal film 101. A 50-nm $MgF_2$ layer is then evaporated at a 50° oblique angle onto the silver film as an alignment layer 108. A substrate 110 is so configured that the same alignment layer 108 is obliquely evaporated on an ITO film which is a transparent electrode formed on a glass substrate. A 4-$\mu$m cell gap is ensured by spacers 109, and then filled with BL009 manufactured by Merck KGaA as a liquid crystal 107. As shown in FIG. 2A, a white light is incident on the device through a sheet polarizer as a p- and linearly polarized light, and a voltage is applied thereto to determine the dependence of the reflected light on the wavelength. The results are shown in FIG. 2B. At a voltage of 0 V, there is an absorption maximum in the vicinity of 640 nm. The absorption maximum shifts towards the lower wavelengths with the application of a voltage. At 10V, it is at 560 nm, and at 30 V, it is at 450 nm. The measured results are in good agreement with the calculated results.

Further, as another technology, there is a technology utilizing re-radiation of the absorbed light. As the example thereof, a description will be given to the technology shown in "SID 97 DIGEST" U.S., 1997, pp. 63–66. FIG. 3A is a cross sectional view of a device for obtaining transmitted light in a specific wavelength range by implementing the conventional Kretschmann method in a symmetric structure. FIG. 3B is a diagram showing the calculated results of the transmitted light intensity with respect to the wavelength when the refractive index of the central medium is changed in the device. This device is considered the same as the one obtained by removing the substrate 110 side, and providing a structure identical with the upper side structure on the lower side in symmetric relation in the device having the structure shown in FIG. 2A. However, the film thickness of the electro-optical material 111 of the central part is set much thinner as compared with the device of FIG. 2A. This symmetric structure and the very thin central electro-optical material 111 enable the coupling of the surface plasmon wave generated at the interface on the incident side to the surface plasmon wave at the next interface with the metal to generate another surface plasmon wave on the outgoing side. This surface plasmon wave re-radiates the light with the same wavelength. In this manner, it is possible to re-radiate the absorbed light. FIG. 3B shows theoretical calculated results when the anisotropic refractive index dn of the central material is changed from 0 to: 0.2, and 0.5 in this device. When the dn is 0, the device radiates the light of a wavelength of 450 nm, at 0.2 and 0.5, 530-nm light and 650-nm light are radiated, respectively. Since surface plasmon is a surface effect, the film thickness of the central material is set to be very thin, or about one wavelength in order to effect such re-radiation. When a liquid crystal material is used as the central material, it is considered that the response speed can be about two orders of magnitude faster than the response speed of a conventional liquid crystal device because of the thinness of the film thickness.

Furthermore, as still other technology of the reference, the technology as shown in FIG. 4 shows an example of the configuration of a direct-view type liquid crystal display apparatus for performing a field sequential display utilizing surface plasmon. Here, one device of FIG. 3A is used as a device 100. The light from a line source 112 is incident through a cylindrical lens 113 on the device 100, and one color of the three primary colors of light is selected for every time period. The light is applied onto the whole surface of a liquid crystal panel 115 by a reflector 114 having a stepped surface to permit field sequential display. Further, in patent publications or other references, there are proposed other liquid crystal display devices or projectors utilizing them. As the technology described in U.S. Pat. No. 5,570,139, an example of a light source for a liquid crystal display device utilizing surface plasmon as shown in FIG. 5 will be described. White light is applied from the upper right to be sequentially incident on a plurality of (three) unit devices 100A, 100B, and 100C. Thus, the outgoing light therefrom is established itself as a light source. At respective unit devices 100A, 100B, and 100C, light beams of specific wavelength ranges, i.e., blue, green, and red light beams are individually absorbed to obtain respective colors of yellow, magenta, and cyan. This cycle is repeated in three devices to obtain a light of a prescribed color.

On the other hand, as an example in which surface plasmon is utilized for a projector, there is a technology shown in "SPIE", vol.3019, pp. 35–40 (1997). FIG. 6 is a cross sectional view of an example of the projector utilizing surface plasmon according to the technology. A central surface plasmon device 100D has almost the same structure as the one shown in FIG. 5, except that the prisms 103 of FIG. 5 are integrated into one unit. There are placed a lamp 116, a reflector 117, a relay lens 118, an integrator 119, and a sheet polarizer 120 on the incident side. On the other hand, there is placed a reflection type liquid crystal display apparatus or the like, not shown, which performs monochrome modulation through a projection lens 121 to obtain an image on the outgoing side, thus performing image display. The light from the lamp is collected in one direction by the reflector, and then brought close to a parallel beam in a narrow region by the relay lens and the integrator. The light beam is then aligned into either polarized light by the sheet polarizer, and selection of color and image display are performed at the surface plasmon device. Finally, the image is projected through the projection lens. The projection can be accomplished based on the field sequential display.

Further, in Japanese Laid-open Patent Publication No. Hei 5-313108, there is disclosed a light modulator in which a metal-insulator interface is formed adjacent to a planar wave guide for carrying a light wave. With the light modulator, a high frequency voltage applied to the interface causes the insulator to resonate, generating a surface plasmon wave on the interface. The resulting wave is coupled to a gradually vanishing light wave in the wave guide, thus changing the intensity of the light wave.

The foregoing prior-art light modulator, especially, the light modulator utilizing surface plasmon, and a display apparatus utilizing the same, encounter the following problems. The first problem lies in that the structure is complicated. This is attributable to the fact that, in the prior art, three unit devices each having a wavelength variable by an electric field are required for simultaneously obtaining light beams of three primary colors of specific wavelength ranges. The second problem lies in that loss of light is high. The reason for this is that only the reflected light from which light at surface plasmon has been absorbed, or the re-radiated light of the absorbed light is utilized. Therefore, the whole of light which has not been used results in a loss. For example, with the technology of FIG. 4, the period during which one color produced by the field sequential display is displayed, other 2 colors of the three primary colors are not utilized at all. The third problem lies in that there exists no light modulator capable of ensuring a division both temporally and spatially.

SUMMARY OF THE INVENTION

It is therefore an object of the present invention to provide a light modulator with a simplified structure. It is another object of the present invention to provide a light modulator whereby the loss of light is minimized. It is a still further object of the present invention to provide a light modulator capable of ensuring division both temporally and spatially. It is yet further object of the present invention to provide a display apparatus using the aforementioned light modulator, and a display method thereof.

The present invention relates to a light modulator utilizing surface plasmon generated at the interface between a thin metal film and an electro-optical material. Then, the present invention is characterized by including two unit devices, and a mirror, the two unit devices, each comprising: a pair of prisms individually provided with thin metal films at their respective undersides, and the thin metal films being oppositely disposed, and an electro-optical material sandwiched between the oppositely disposed thin metal films, wherein the two unit devices are disposed in parallel to each other such that respective one surfaces of the one prisms of the unit devices are in contact with each other so as to ensure the arrangement of the thin metal films in parallel relation to each other, and the mirror is disposed such that the mirror side thereof faces a direction in parallel to the thin metal films, and extends along the top of the prism of one unit device on the side thereof not in contact with another unit device. As the electro-optical material, a liquid crystal material is used. Alternatively, an air gap can be adopted in place of the electro-optical material. The thickness of the air gap may also be changed by a piezo material provided between the prisms constituting the unit device. Further, it is possible to adopt a diffraction grating in place of the prism. Furthermore, a light source can be configured, or a liquid crystal display apparatus or a liquid crystal projector can be configured, by utilizing the foregoing light modulator.

With the light modulator according to the present invention, all of the incident light can be utilized in the final outgoing light with no loss by making both of the transmitted light due to absorption and re-radiation generated by the unit device and the reflected light into the outgoing light; the light incident on the next unit device, or the light incident on the mirror. Further, the color of light can be spatially divided. Still further, it can also be divided temporally by changing the wavelength by a voltage.

DETAILED DESCRIPTION OF THE PREFERRED EMBODIMENTS

Below, the preferred embodiments of the present invention will be described in detail by reference to the appended drawings.

Figure 1A:
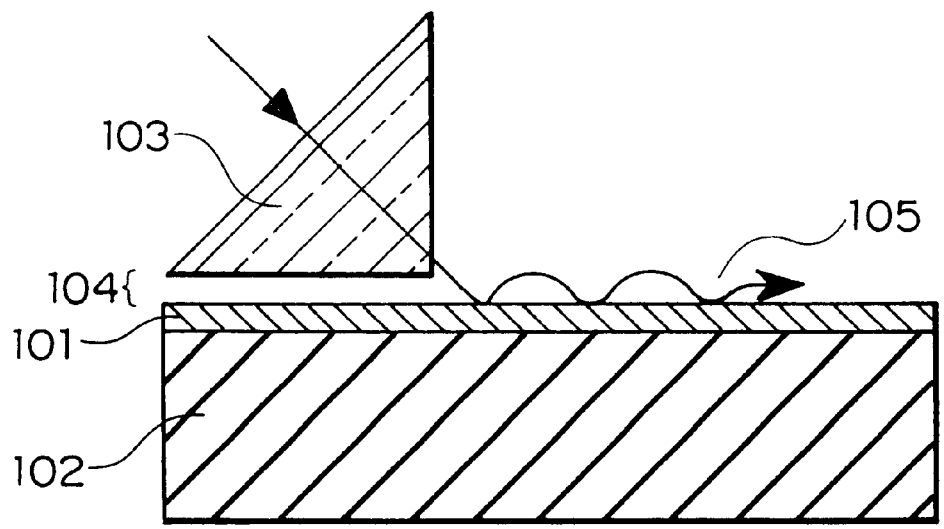
FIGS. 1A and 1B are illustrative diagrams of a conventional surface plasmon wave generator by Otto and a surface plasmon wave generator by Kretschmann in the prior art, respectively.
Figure 1B:
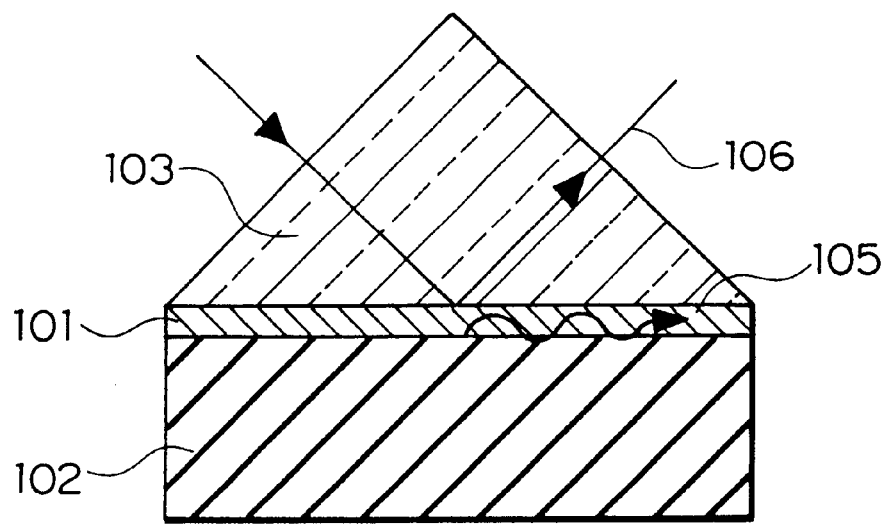
Figure 2A:
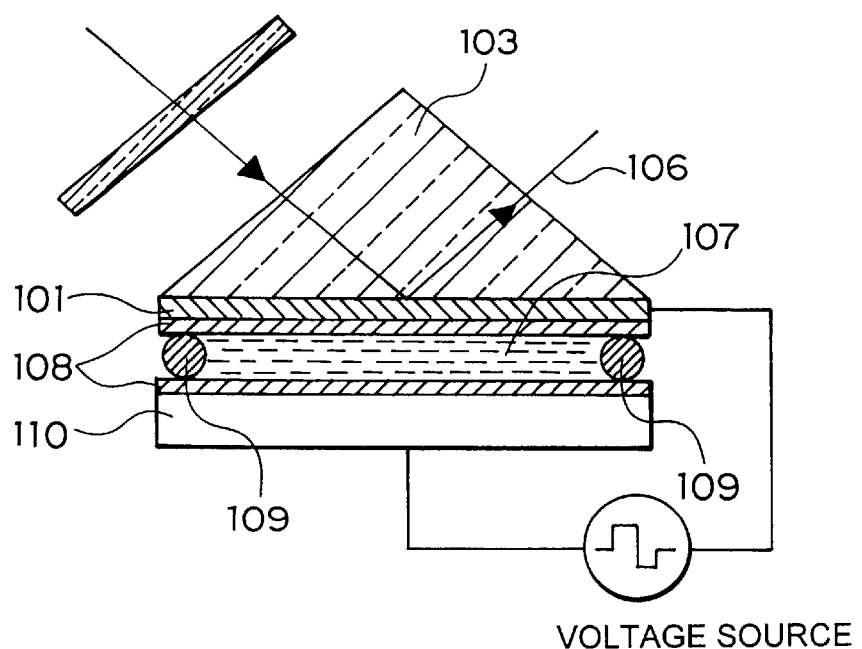
FIGS. 2A and 2B are, respectively, a cross sectional view of a configuration of a device whereby the absorption wavelength is made variable by using a conventional liquid crystal and the wavelength range of the reflected light is electrically changed, and a graph showing the measured and calculated results of the reflected light intensity characteristics with respect to the wavelength when the voltage value is changed in this device.
Figure 2B:
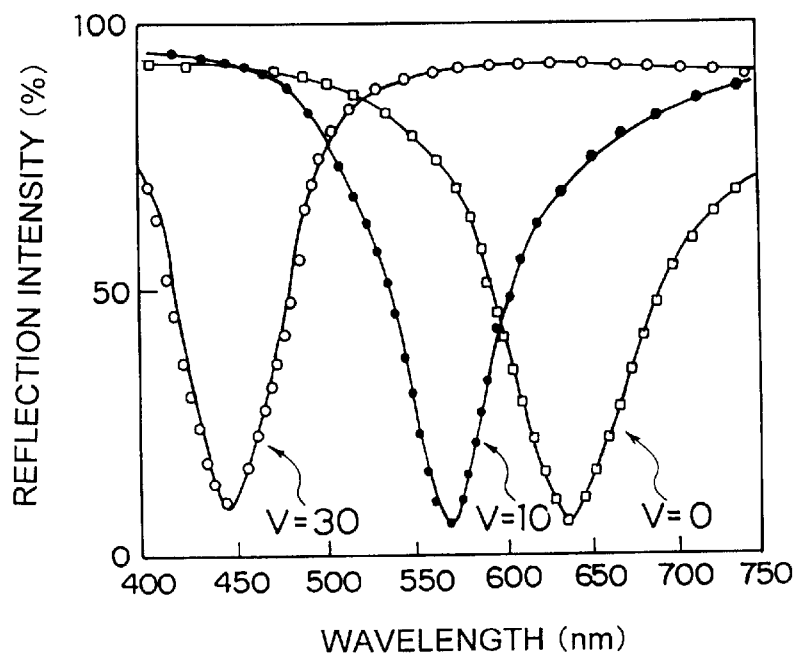
Figure 3A:
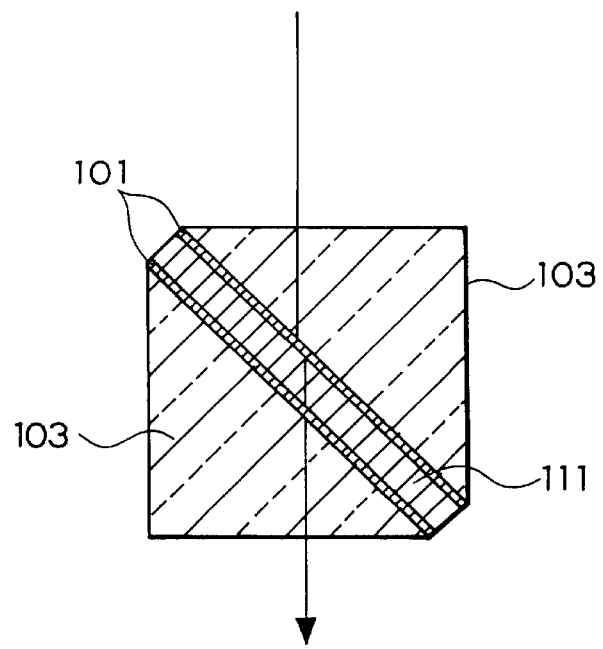
FIGS. 3A and 3B are, respectively, a cross sectional view of a device implementing the conventional Kretschmann method in a symmetric structure to obtain the transmitted light within a specific wavelength range; and a graph showing the calculated results of the transmitted light intensity with respect to the wavelength when the refractive index of the central material is changed in this device.
Figure 3B:
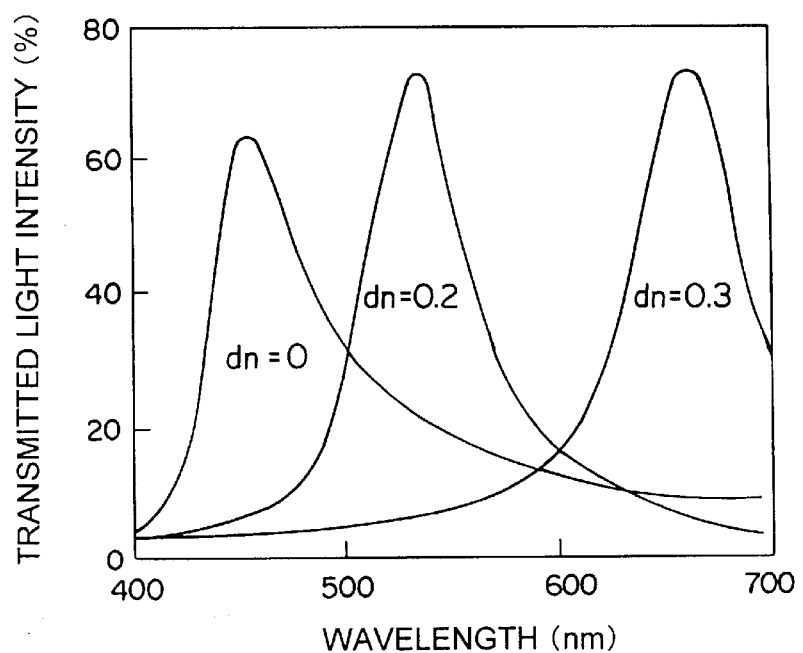
Figure 4:
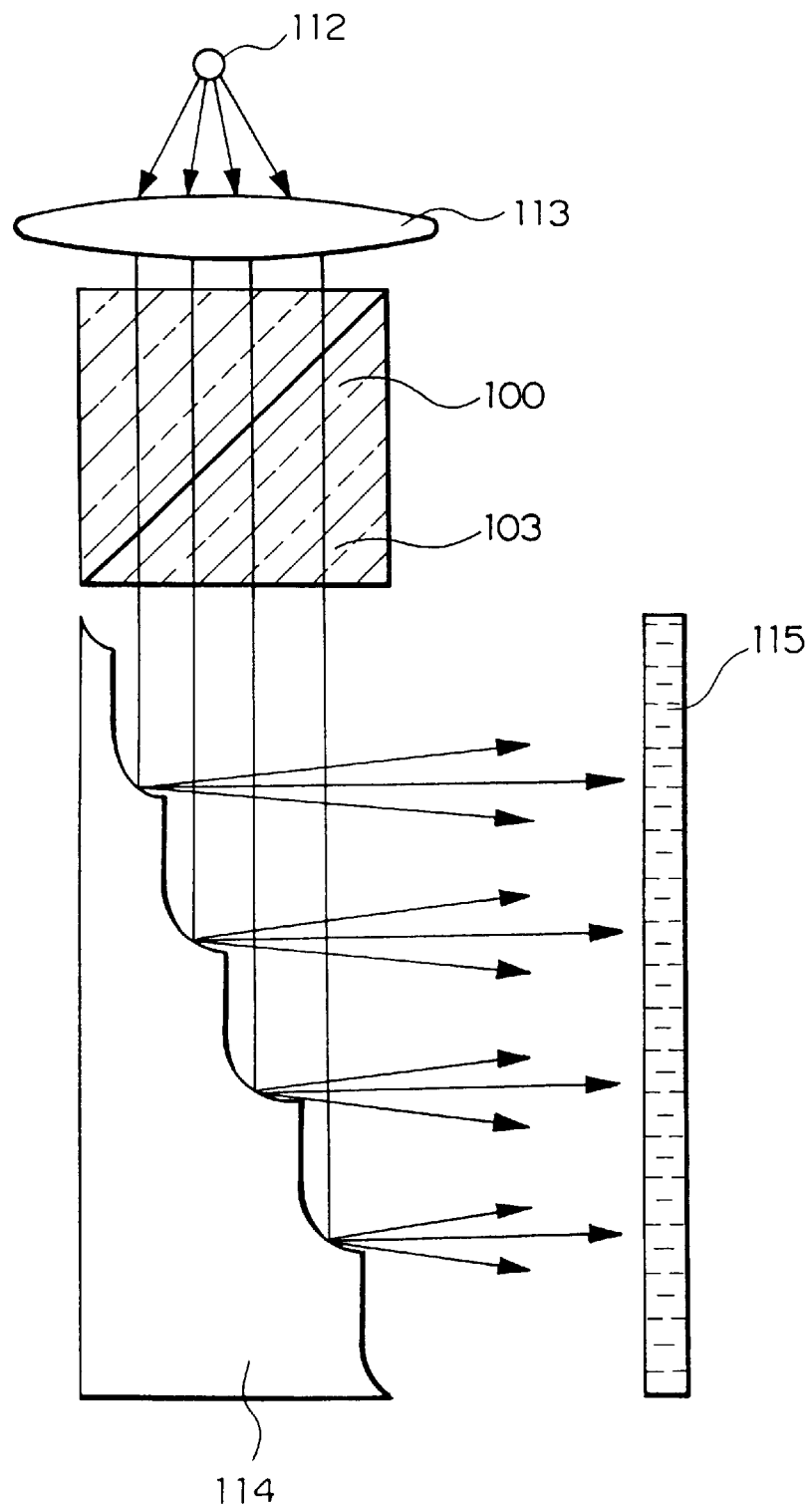
FIG. 4 is a view of the configuration of a direct-view type liquid crystal display apparatus for performing the field sequential display utilizing a conventional surface plasmon.
Figure 5:
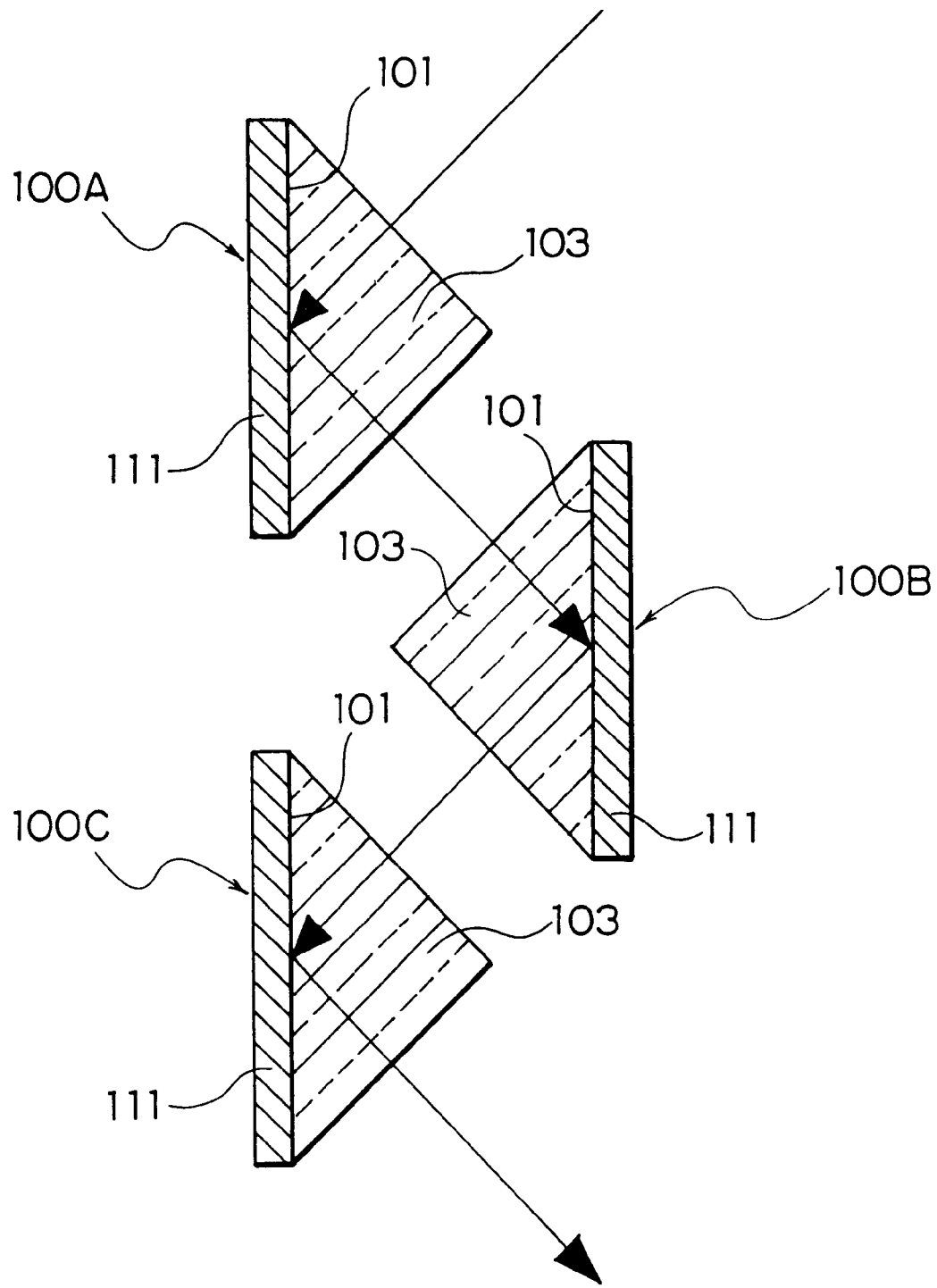
FIG. 5 is a view showing an example of a light source for a conventional liquid crystal display device utilizing surface plasmon.
Figure 6:
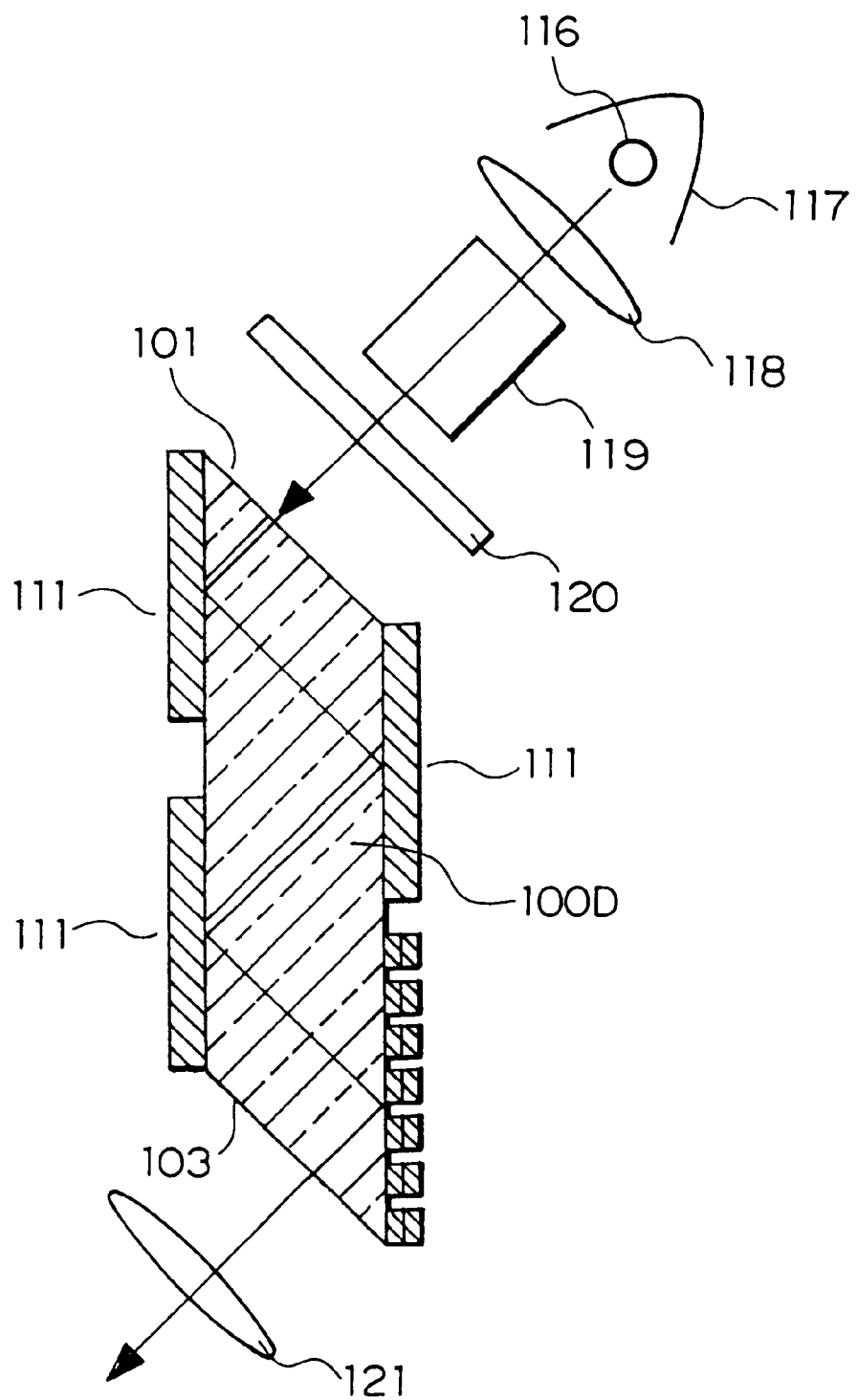
FIG. 6 is a view of the configuration of one example of a conventional projector utilizing surface plasmon.
Figure 7A:
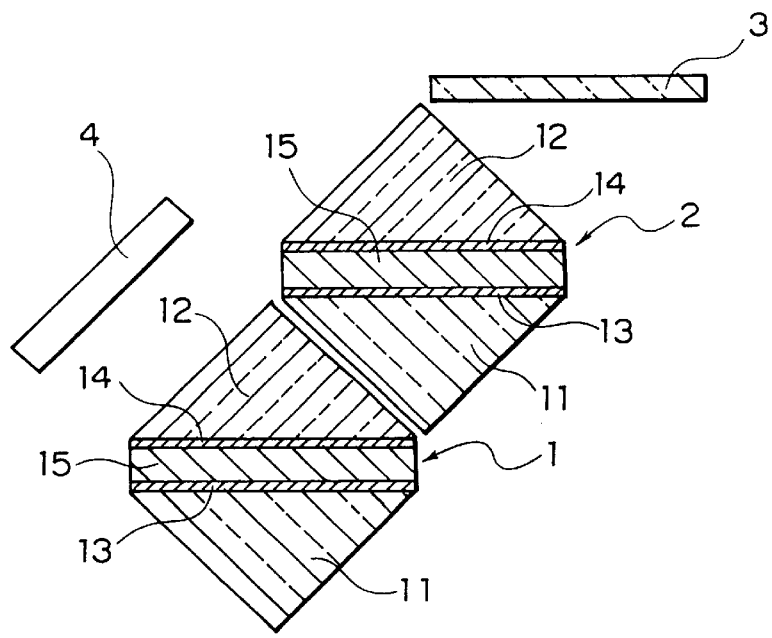
FIGS. 7A and 7B are views illustrating the configuration and the operation of the first embodiment of the present invention, respectively.

First, a first embodiment of the present invention will be described. As shown in FIG. 7A, the apparatus of the first embodiment of the present invention comprises first and second unit devices 1 and 2 each implementing the Kretschmann method in a symmetric structure, and one mirror 3. If required, a device for aligning the polarization direction into one direction is added thereto. Here, a polarization conversion device 4 is provided in a light incident path. The first and second unit devices 1 and 2 each implementing the Kretschmann method in a symmetric structure are so configured that the respective inclined surfaces of two prisms 11 and 12 each having a right triangle cross section are oppositely disposed, and thin metal films 13 and 14 are respectively formed on the inclined surfaces, and further an electro-optical material 15 whose refractive index varies in accordance with the electric field strength is inserted between the oppositely disposed thin metal films 13 and 14. Then, the first and second unit devices 1 and 2 are arranged in parallel relation to each other with respective one surfaces of the prisms substantially in contact with each other. As a result, each underside of the prisms 11 and 12 and the thin metal films 13 and 14 are arranged in parallel relation to one another. At the same time, the surface side of the mirror 3 is also disposed so that it is parallel to the aforesaid parallel plane, and one end thereof is substantially in contact with the top of the prism of the second unit device 2 on the side thereof not in contact with the first unit device 1. Further, the polarization conversion device 4 is disposed at the incident light side position of the first unit device 1 not in contact with the mirror 3, i.e., at the position opposing the side of the prism 12 not in contact with the second unit device 2.

Figure 7B:
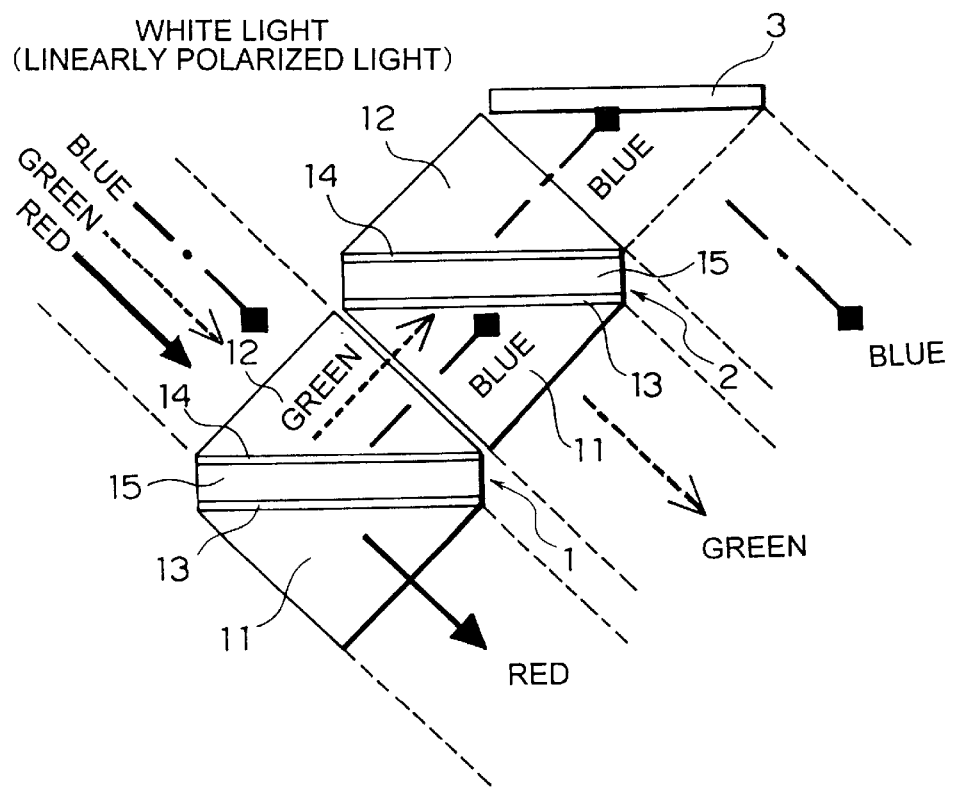

FIG. 7B is a diagram illustrating the operation of the apparatus of the first embodiment thus configured. It is a diagram schematically showing how the light beams of three primary colors of R, G, and B (red, green, and blue) are transmitted. The white light which has been made into a linearly polarized light by the polarization conversion device 4 is incident on one surface of the prism 12 of the first unit device 1., and reaches the thin metal film 14. Here, at a certain time, the first unit device 1 on the incident side absorbs a light of red, and re-radiates it. Therefore, red light is emitted. The reflected light including the other green and blue light is incident on the second unit device 2. At the second unit device 2, the light reaches the thin metal film 13 through the prism 11, and blue light is absorbed, and re-radiated. Therefore, green light is emitted as reflected light. Further, blue light passes through the second unit device 2, and then it is reflected by the mirror 3, and emitted therefrom. Thus, white light is spatially divided in the order of red, green, and blue. Further, the refractive index of the electro-optical material 15 is changed by individually applying the first unit device 1 and the second unit device 2 with a voltage. Therefore it is possible to change the wavelength of the light to be absorbed and re-radiated. For example, in the case where green and red are absorbed and re-radiated at the first unit device 1 and the second unit device 2, respectively, the white light is spatially divided in the order of green, blue, and red. The spatially divided light can also be divided temporally by performing a temporal switching in this manner. The loss of light is also very low. Especially insertion of the polarization conversion device 4 for aligning non-polarized light with linearly polarized light at the incident side results in almost no loss of light.

Then, a second embodiment of the present invention will be described. In the second embodiment of the present invention, a liquid crystal material is used as the electro-optical material 15 whose refractive index varies with the electric field of the first embodiment. In this case, there is formed an alignment layer for aligning the liquid crystal material, if required. The operation of the second embodiment is the same as that of the first embodiment. The liquid crystal alignment of the liquid crystal material serving as the electro-optical material 15 is changed by the application of a voltage, and the refractive index of the liquid crystal material changes due to the anisotropic refractive index which the liquid crystal has. Consequently, it is possible to change the wavelength by a voltage. Especially noteworthy is the following fact. Since the liquid crystal material region is a very thin film with a thickness of about one wavelength, switching is done not based on a bulk, but based on only the surface. Accordingly, the response can be obtained about two orders of magnitude faster than the device using a conventional liquid crystal material. Consequently, a light modulator capable of giving a fast response can be obtained.

For example, referring to FIG. 7, prisms of 60° $SF_6$ glass (manufactured by Shott Co., Germany) are used as the prisms 11 and 12 of the first and second unit devices 1 and 2, and silver thin films are evaporated thereon as the thin metal films 13 and 14. Further, $MgF_2$ is obliquely evaporated thereon as an alignment layer, which is not shown. A liquid crystal is sandwiched as the electro-optical material 15 between the prisms 11 and 12. Thus, the prisms 11 and 12 are joined together without using an adhesive. The thin metal films 13 and 14 are wired so as to enable the application with a voltage. The first and second unit devices 1 and 2 are each thus configured and are optically cemented to each other using a matching oil with a refractive index of 1.805, almost the same as that of $SF_6$. Further, a mirror 3 is placed. The light from a white light source is shined thereon through a sheet polarizer serving as the polarization conversion device 4. Then, the light is spatially divided into red, green, and blue by applying a voltage across the wiring, i.e., between the thin metal films 13 and 14. Further, it is possible to perform temporal switching by adjusting the voltage value. It is possible to provide high-speed switching in the order of (1) red, green, and blue, (2) green, blue, and red, and (3) blue, red, and green.

In this case, the one of the rutile crystal structure obtained by heating titanium oxide is used as the prism 11 or 12. The refractive index is found to be about 2.8. The first and second unit devices 1 and 2 are manufactured using the prisms, and arranged in parallel relation to each other. Then, a mirror 3 is further provided thereon. There is also provided a polarization conversion device 4 for converting non-polarized light into p-polarized light. With such a configuration, the efficiency is enhanced by the effects of the polarization conversion device and the use of the high-index prisms much more than with the foregoing configuration. Further, although a consideration was also given to the case where the FDS1 glass of HOYA Co., with a refractive index of about 1.92 was used, the efficiency of the rutile prism was found to be higher.

Figure 8A:
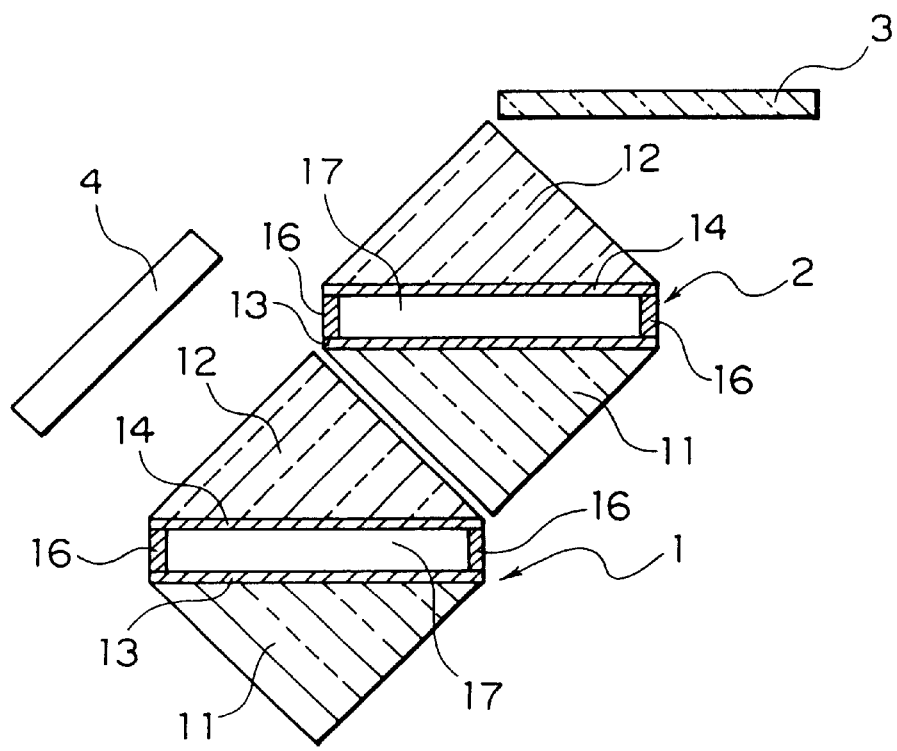
FIGS. 8A through 8C are views illustrating the configuration and the operation of the third embodiment of the present invention.

Then, a third embodiment of the present invention will be described. In the third embodiment of the present invention, an air gap is adopted in place of the material 15 whose refractive index varies with the electric field of the first embodiment, and the material exhibiting the piezoelectric effect is placed at either end or both ends of the space between the opposing prisms 11 and 12. FIG. 8A is a diagram showing the configuration of the third embodiment. Piezo materials 16 are respectively disposed on both ends of the space between the prisms 11 and 12 in place of the electro-optical material 15 provided in the first embodiment, and thus, an air gap 17 is provided between the prisms 11 and 12 by the piezo materials 16.

Figures 8B, 8C:
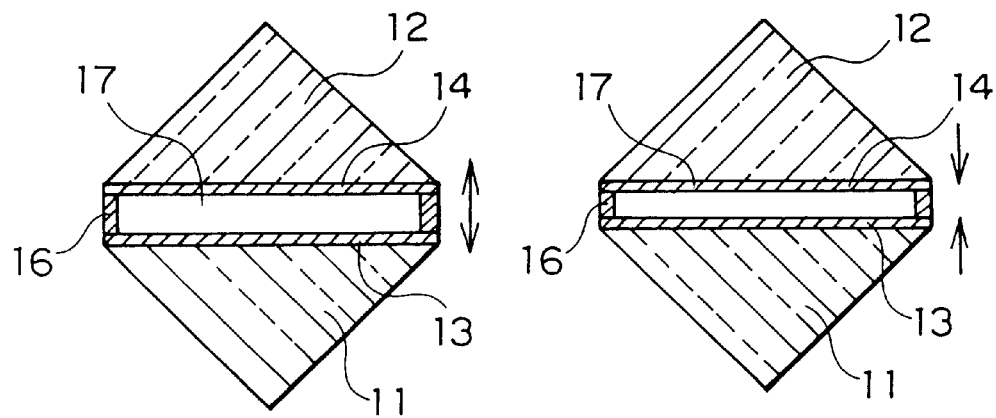

FIGS. 8B and 8C are diagrams illustrating the operation of the third embodiment. In this third embodiment, as distinct from the first and second embodiments, the application of a voltage changes not the refractive index, but the thickness of the air gap 17. The application of the piezo materials 16 with a voltage causes distortion due to the voltage value. As a result, the elongation as shown FIG. 8B, or shrinkage as shown in FIG. 8C occurs, thereby making it possible to change the thickness of the air gap 17. The coupling conditions for surface plasmon are changed by utilizing this property to obtain the same effects as in the first and second embodiments. The advantage of this method is that, since the region of the air gap 17 has a lower refractive index than a liquid crystal as compared with the case where the liquid crystal is used, the prisms 11 and 12 are not required to have high refractive indices. This is advantageous for achieving a lower cost.

Specific example of the third embodiment include the use of zinc oxide (ZnO) in terms of easiness for achieving a thinner film as the material having the piezoelectric effect. The device of this embodiment can be manufactured in the same manner as in the second embodiment, except that the liquid crystal is not used, and the following process for using the piezo material. Thin films 16 of zinc oxide are formed and patterned on both ends of the silver thin film 13 on each prism 11 of the unit devices 1 and 2. Then, a silver paste is applied thereon in a very small amount by means of a control type dispenser to be joined together with the side of the prism 12 on which the silver thin film 14 is formed. Thus, the air gap 17 is formed between respective silver thin films 13 and 14 of the prisms 11 and 12 by the zinc oxide thin film 16. It is noted that the mirror 3 and the polarization conversion device 4 are used. This specific example can provide the same high efficiency as in the specific example of the first embodiment. Further, in the third embodiment, zinc oxide is used as the piezo material, but any material can be employed as long as they can be formed into thinner films.

For example, even with aluminum nitride (AlN), a good thin film can be formed by a magnetron sputtering method or a dual beam sputtering method. Alternatively, with zinc oxide, a better thin film can be obtained by an ECR plasma sputtering method. On the other hand, a thinner film can also be achieved with a PZT system in recent years.

Figure 9A:
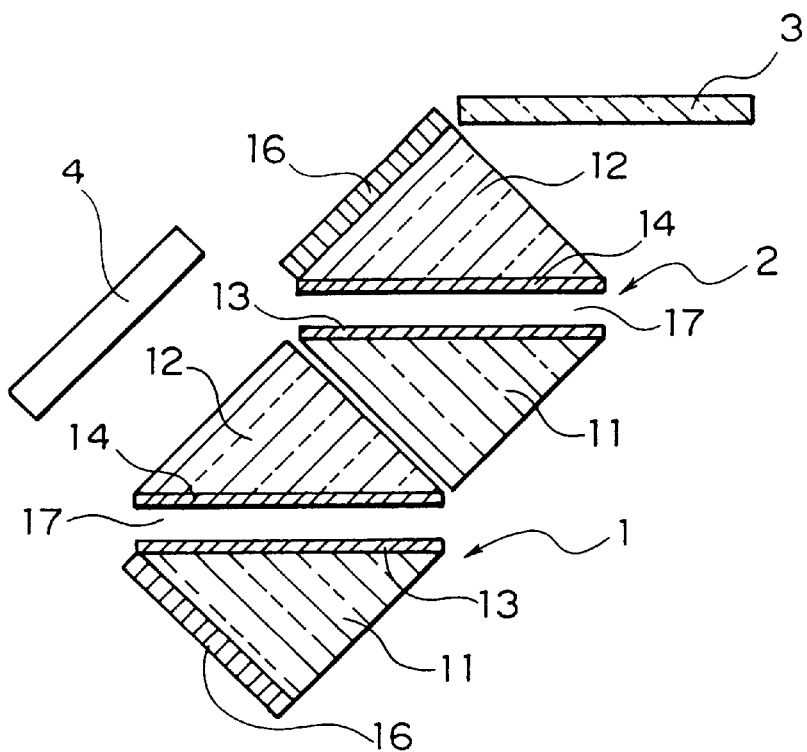
FIGS. 9A through 9C are views illustrating the configuration and the operation of the fourth embodiment of the present invention.
Figures 9B, 9C:
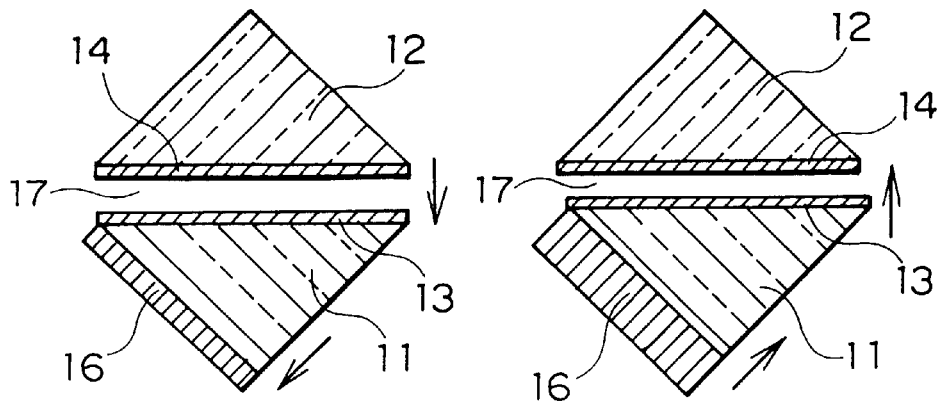

Then, a fourth embodiment of the present invention will be described. In the fourth embodiment of the present invention, there is used the material exhibiting the piezoelectric effect in the same manner as in the third embodiment. However, as shown in FIG. 9A, only an air gap 17 is provided in place of the electro-optical material 15 in the first embodiment. Materials 16 exhibiting the piezoelectric effect are respectively placed on the surfaces of the respective prisms 11 and 12 of the unit devices 1 and 2 through which light of incidence, transmission, reflection, or the like will not. pass. In this fourth embodiment, the thickness of the air gap is varied in the same manner as in the third embodiment. The application of the piezo materials 16 with a voltage causes distortion due to the voltage value. As a result, the elongation as shown FIG. 9B, or shrinkage as shown in FIG. 9C occurs, thereby making it possible to change the thickness of the air gap 17 between the prisms 11 and 12. The advantages of this method are as follows. In addition to the advantage of the third embodiment, the piezo material 16 is not required to be formed into a thin film, and when disposed on the whole surface of each prism as shown in FIGS. 9A, 9B, and 9C, the patterning accuracy is not required because patterning is not necessary, resulting in a low manufacturing cost. Further, the electrode for the piezo material 16 is easy to extract. It is noted that, since the direction of elongation and shrinkage of the piezo material 16 differs from the opposing direction between the prisms 11 and 12, a slight side-to-side movement of the figure occurs, but it occurs in a very narrow range, and hence it can be ignored. Further, in this fourth embodiment, although the same material as in the third embodiment can be used as the piezo material 16, such a reduction in thickness of the film as in the third embodiment is not required in this embodiment. Therefore, more various piezo materials can be used.

Figure 10:
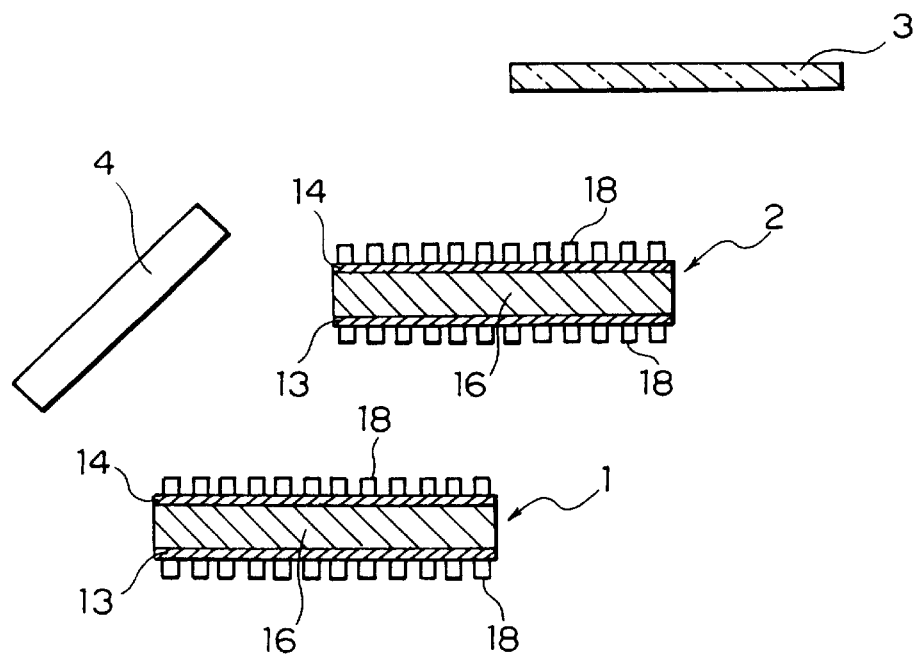
FIG. 10 is a view showing the configuration of the fifth embodiment of the present invention.

Then, a fifth embodiment of the present invention will be described. In the fifth embodiment of the present invention, diffraction gratings are used in place of the prisms 11 and 12 of the first through fourth embodiments. As shown in FIG. 10, a diffraction grating 18 is used at each portion on which the prism of the first embodiment was placed. That is, thin metal films 13 and 14 are respectively formed on both surfaces of the electro-optical material 15 with a desired thickness. The diffraction gratings 18 are individually disposed on their respective surfaces of the thin metal films 13 and 14. For the diffraction grating 18, a diffraction grating having a shorter period than the wavelength of incident light is selected. In this embodiment, in accordance with the first through fourth embodiments, either the electro-optical material such as a liquid crystal or the material exhibiting the piezoelectric effect may be used. In this fifth embodiment, the same operation as in the first embodiment is possible, as well as a particularly large prism is not required. As a result, the whole apparatus becomes compact in size, and a reduction in weight can also be achieved.

Figure 11:
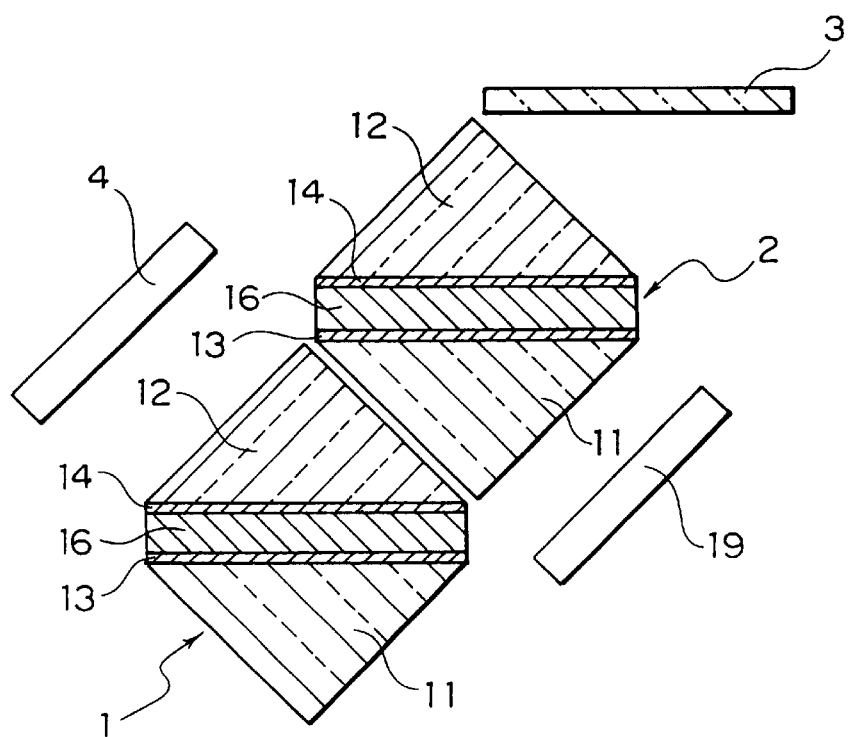
FIG. 11 is a view showing the configuration of the sixth embodiment of the present invention.
Figure 12A:
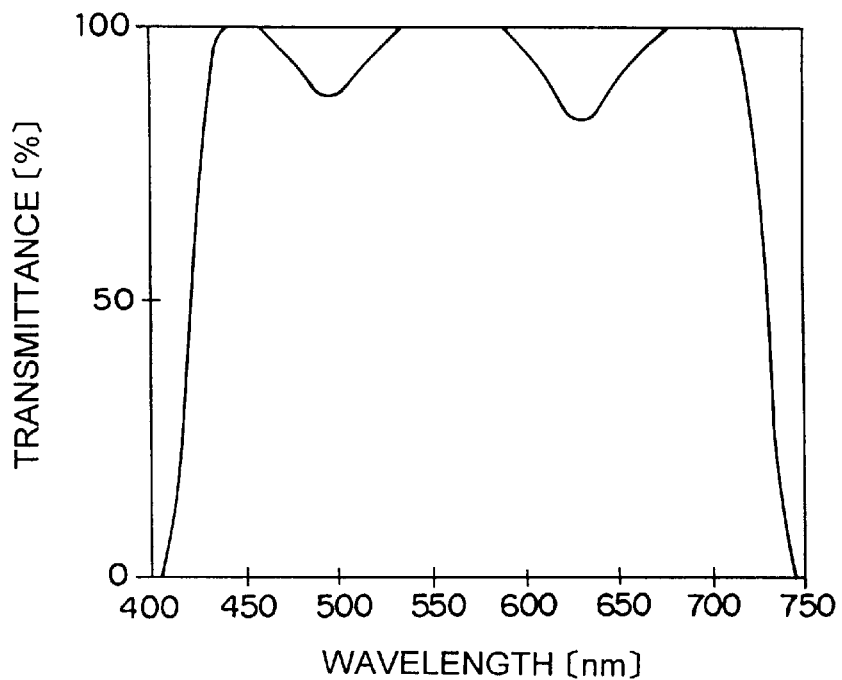
FIGS. 12A and 12B are graphs showing the characteristic example of a filter and the spectral characteristic in the sixth embodiment of the present invention.
Figure 12B:
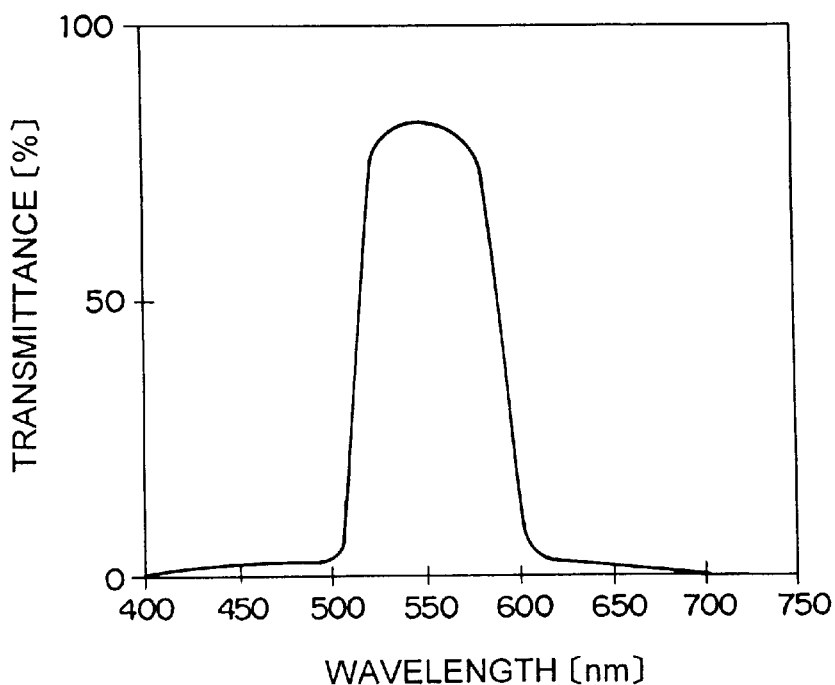

Then, the sixth embodiment of the present invention will be described. In the sixth embodiment, a filter is disposed at the outgoing side of the second unit device used in the first through fifth embodiments. FIG. 11 shows the configuration adapted to the first embodiment as the sixth embodiment. A filter 19 for improving wavelength characteristics is disposed at the outgoing side of the second unit device 2. The filter 19 has characteristics that compensate for differences in wavelength range and intensity between the outgoing light which has been absorbed and re-radiated at each unit device and the outgoing light which has undergone only absorption, and has been reflected at the unit device 1 and the unit device 2. The characteristics of the filter 19 are, if required, also the characteristics for cutting the wavelength region wherein absorption will not satisfactorily arise from the surface plasmon absorption under the conditions such as the voltage, film thickness, and refractive index to be used. FIG. 12A shows one example of the characteristics of the filter used in this sixth embodiment. The characteristics are of the absorption and re-radiation close to the characteristics shown in FIG. 8B. It is indicated that the characteristics are for cutting the light within the unnecessary wavelength region included in the light reflected from the second unit device when the light modulator having peaks at wavelengths of 460 nm, 550 nm, and 680 nm. FIG. 12B shows the wavelength characteristics of the outgoing light in each unit space spatially divided when the sixth embodiment is implemented. It shows the case where red light and blue light is absorbed and re-radiated at the first unit device 1 and the second unit device 2, respectively, and green light is reflected from the second unit device 2. It is indicated that the unnecessary wavelength region is cut so that the spatial division of colors is satisfactorily achieved.

Figure 13:
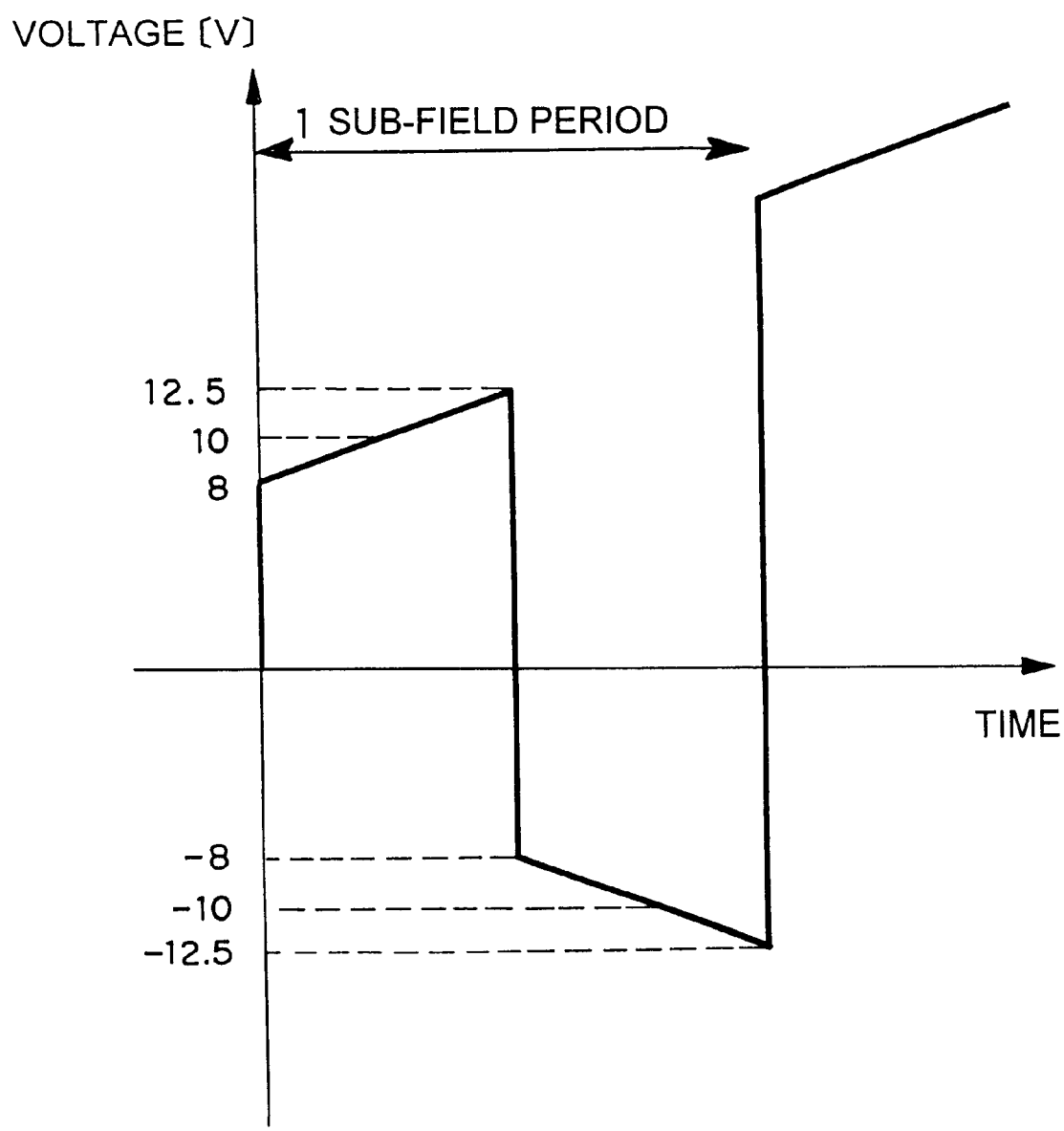
FIG. 13 is a graph showing a driving method in the seventh embodiment of the present invention.
Figure 14A:
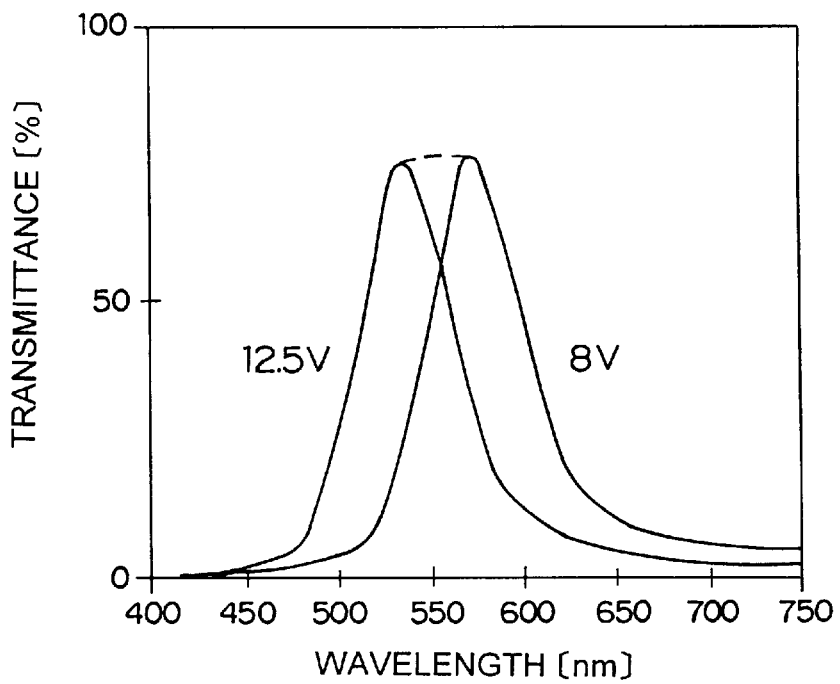
FIGS. 14A and 14B are graphs showing the spectral characteristic in the eighth embodiment of the present invention.
Figure 14B:
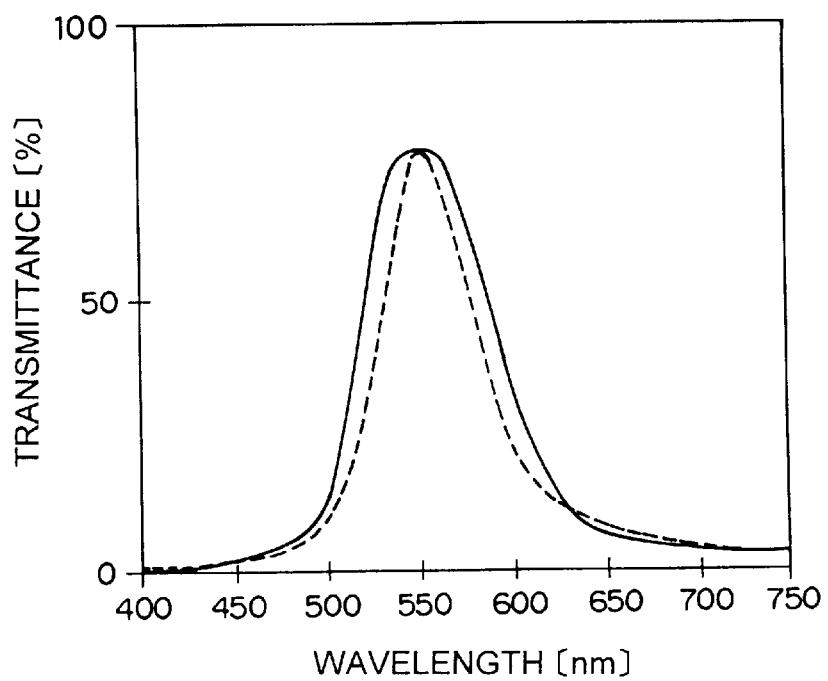

Then, a seventh embodiment of the present invention will be described. This seventh embodiment relates to a method for applying an electric field, i.e., a driving method in the first through sixth embodiments. FIG. 13 shows one example of the driving method in the seventh embodiment. This example of the driving method is characterized in that it is for not setting constant the wavelength of the light absorbed within the field sequential sub-field time, but shifting it as shown in the figure. That is, the amplitude of the voltage to be applied within the sub-field is changed. FIG. 14A is a graph showing the wavelength characteristic range to be shifted by the driving method. FIG. 14B is a graph showing a difference in wavelength characteristics between the case where the aforesaid driving method is utilized (solid curve) and the case where it is not utilized (a broken curve). With this driving method, since the amplitude of the voltage to be applied within the sub-field time is varied, the emitted light corresponds to the time average of the one which has shifted its wavelength characteristics in accordance with the change. Therefore, it is possible to adjust the width of the wavelength region. At the same time, the wavelength region of the light reflected from the second unit device can also be adjusted. In FIG. 14B, although a positive and negative symmetrical voltage is to be applied on the liquid crystal portion, application of a voltage of only either polarity is sufficient when problems such as image persistence will not occur. Even in the case of the piezo material, the conditions for the applied voltage value differs therefrom, but the implementation is possible in the same manner.

Then, an eighth embodiment of the present invention will be described. In the eighth embodiment of the present invention, a compression color division light source is configured by using one light modulator of the first through seventh embodiments. Although not particularly shown in this embodiment, in the first through seventh embodiments, since the respective first and second unit devices 1 and 2 are capable of dividing light into light beams of different wavelengths, and respectively emitting them therefrom, it is possible to configure the compression color division light source. Here, the compression color division light source denotes a source of both temporally and spatially divided light, and having a low loss of light. For example, as shown in FIG. 13B, it can be implemented by a combination of a white light source including light beams of a large number of wavelength regions, or the like, and the light modulator of the first embodiment. Similarly, it can be implemented by a combination of the white light source, or the like, and any one light modulator of the second through seventh embodiments. The light source of this eighth embodiment eliminates a loss of light in the field sequential display.

Figure 15A:
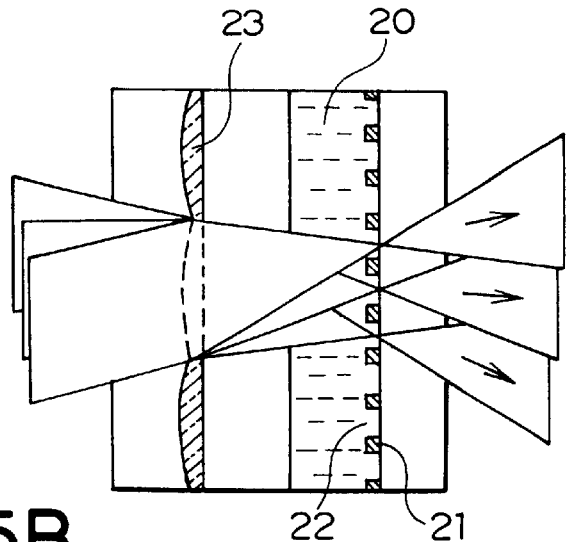
FIGS. 15A through 15C are views showing the operation of the ninth embodiment of the present invention.
Figure 15B:
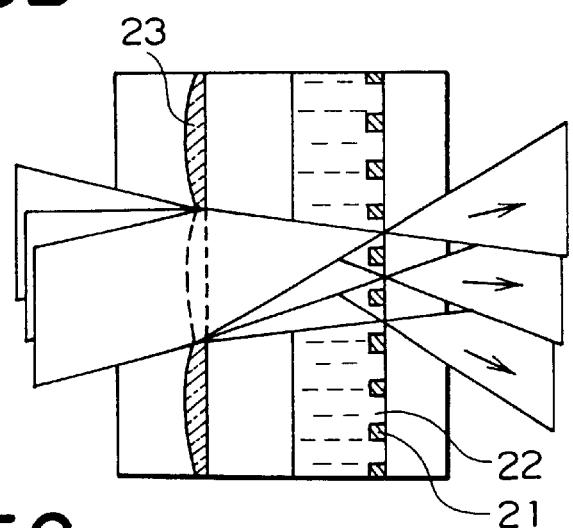
Figure 15C:
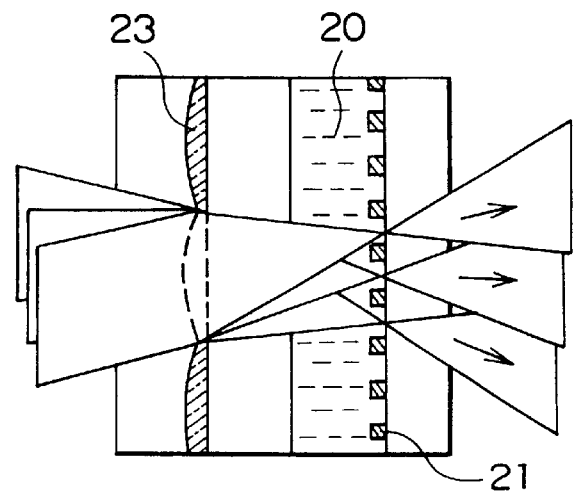

Then, a ninth embodiment of the present invention will be described. In the ninth embodiment of the present invention, a liquid crystal display apparatus of the field sequential method is configured by using any one light modulator of the first through seventh embodiments, or the compression color division light source of the eighth embodiment. FIGS. 15A through 15C are views illustrating a part of the liquid crystal display apparatus according to the ninth embodiment; and the operation thereof. That is, a liquid crystal 20 of the liquid crystal display apparatus is configured as a liquid crystal panel of a direct-view type, reflection type, or projection type. One micro lens 23 is disposed opposite to every set of three aperture portions 22 out of the aperture portions individually defined by the respective light-shielding portions 21 of the liquid crystal 20. Any one light modulator or light source of the first through eighth embodiments is placed at the left-hand portion outside the figure with respect to each micro lens 23. With this configuration, the optical path of light of each divided color is adjusted by the lens, and the light is to be incident from the left side of the figure. The light enters the liquid crystal layer through each micro lens, and passes through a picture element structure from the aperture portions and the light shielding portions. In a first period, as shown in FIG. 15A, red, blue, and green are sequentially displayed on their respective pixels, vertically from the highest one. In the next period, green, red, and blue are displayed in this order as shown in FIG. 15B, and in the final period, blue, green, and red are displayed in this order as shown in FIG. 15C. Repetition of this procedure permits the field sequential display by a method whereby colors are switched individually on each picture element. Consequently, a liquid crystal display apparatus with a low loss of light can be obtained.

Then, a tenth embodiment of the present invention will be described. In this tenth embodiment, a projector is configured based on the first through ninth embodiments. Although not shown, this embodiment is implemented by adapting the first through ninth embodiments to a part of the projector apparatus. The operation thereof is the same as described above. The projection type such as a projector shows a high loss of light, and hence requires the high intensity of the light source. Thus, it has presented problems of an increase in dissipation power, a reduction in size of the apparatus, and the like. With the configuration of this embodiment, a projector with no loss of light can be obtained. Further, as the display method with the projector, there are methods using other various apparatuses such as a DMD (digital mirror device) and a TMA (thin film micro-mirror array), other than the method using the liquid crystal display apparatus of the ninth embodiment. Further, the embodiment using a large number of these devices is also possible.

Then, an eleventh embodiment of the present invention will be described. The eleventh embodiment of the present invention relates to a method for driving the liquid crystal display apparatus in the ninth embodiment, or the projector of in the tenth embodiment. The light beams which have been spatially divided and emitted have different intensities for every unit space. This is attributable to the designing conditions and manufacturing conditions of the unit device, differences in reflectance of the mirror, and optical path difference, and the medium in the optical path, and the like other than the difference in intensity between the light emitted due to the absorption and re-radiation, and the light emitted due to only twice absorption and reflection. Then, the liquid crystal display apparatus or the projector is driven so as to correct the differences by an apparatus for monochrome modulation, or the like to be used therein.

Figure 16A:
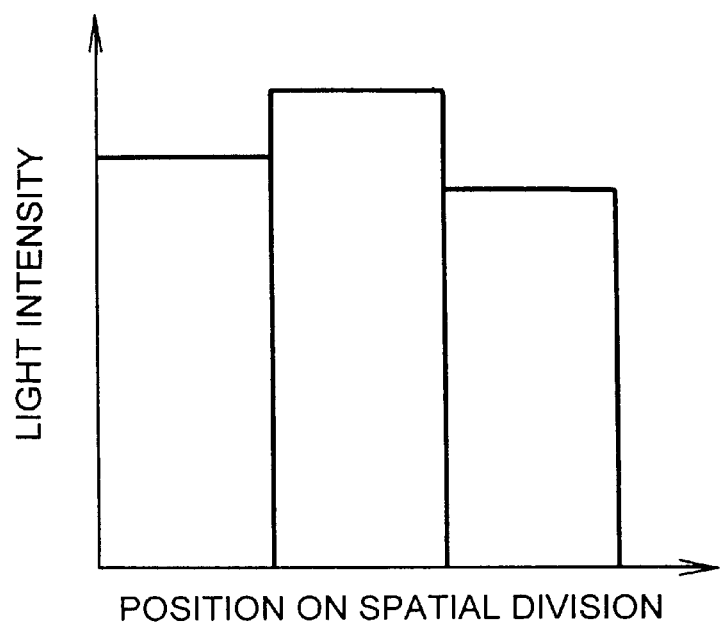
FIGS. 16A and 16B are graphs showing the intensity of spatially divided light of the eleventh embodiment of the present invention.
Figure 16B:
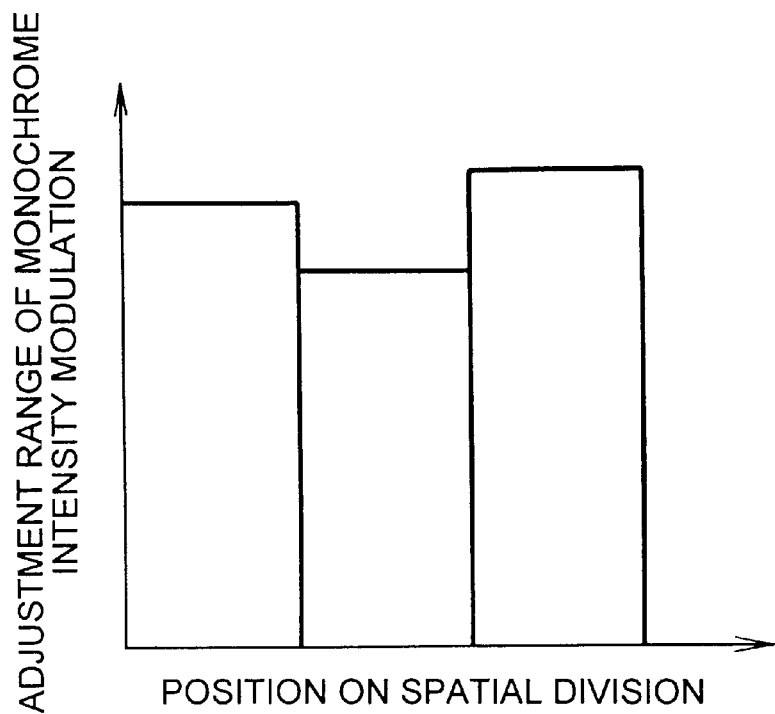

FIGS. 16A and 16B are graphs showing the operation of the eleventh embodiment. FIG. 16A shows the intensity of each spatially divided light beam obtained by the light modulator. FIG. 16B shows the range in which the intensity of the monochrome modulation for the characteristics of FIG. 16A is set. The one resulting from the synergistic effect between the characteristics of FIGS. 16A and 16B can be obtained as an actual display. This method can eliminate the difference in intensity generated by the light modulator.

As described above, according to the present invention, the light modulator is comprised of two unit devices utilizing the surface plasmon generated at the interface between the thin metal film and the electro-optical material, and a mirror. Both of the transmitted light due to absorption and re-radiation, and the reflected light generated by the unit device are made into the outgoing light, the incident light on the next unit device, or the incident light on the mirror. Consequently, all light beams can be utilized as the final outgoing light beams with no loss of light. Further, the color of light can be spatially divided, and still further, it can also be temporally divided by changing the wavelength due to a voltage.

Therefore, according to the present invention, there can be provided the following effects. First, since only two unit devices to be applied with an electric field is required, the structure becomes very simple. Secondly, since both the transmitted light which has been re-coupled by a symmetrical structure and the reflected light are used artfully and effectively, the light can be utilized effectively with a very low loss of light. Thirdly, since the light can be spatially divided into respective wavelength regions due to the device structure, while it can also be temporally divided because of the variance of the wavelength due to the application of an electric field, there can be provided a light modulator capable of performing a division both temporally and spatially. Fourthly, since the refractive index is lowered because of the simplified structure of the apparatus and use of the piezoelectric effect, costly prisms or costly diffraction gratings become unnecessary, and cheap prisms or cheap diffraction gratings can be used. Therefore, the apparatus can be implemented at a low cost. Fifthly, since the diffraction grating is used in place of the prisms, the whole apparatus becomes compact in size, and is reduced in weight. Sixthly, since the filter for correcting the wavelength characteristics is used, and the wavelength characteristics are improved by devising the driving method, the wavelength characteristics of the emitted light are enhanced.

What is claimed is:

1. A light modulator using surface plasmon generated at the interface between a thin metal film and an electro-optical material, comprising two unit devices and a mirror, wherein said two unit devices, each comprising a pair of prisms individually provided with thin metal films at their respective undersides, and said thin metal films being oppositely disposed, and an electro-optical material being sandwiched between said oppositely disposed thin metal films, and said two unit devices are disposed in parallel to each other such that respective one surfaces of the one prisms of said unit devices are in contact with each other so as to ensure the arrangement of said thin metal films in parallel relation to each other, and said mirror is disposed such that the mirror side thereof faces the direction in parallel to said thin metal films, and extends along the top of the prism of one unit device on the side thereof not in contact with another unit device.

2. The light modulator according to claim 1, wherein a liquid crystal material is used as said electro-optical material.

3. The light modulator according to claim 1, wherein said prism is replaced with a diffraction grating.

4. The light modulator according to claim 1 wherein a device for aligning the polarization direction into one direction is disposed on the incident light side of the other unit device not in contact with said mirror.

5. The light modulator according to claim 1, wherein a filter for adjusting the wavelength characteristics is disposed on the outgoing side of said one unit device.

6. A light source of a compression color division system, comprising a combination of said light modulator according to claim 1 and a source of white light to be incident on said light modulator.

7. A display apparatus comprising:
a light source according to claim 6, which illuminates a liquid crystal panel, and
a display unit to display the projected image on said liquid crystal panel or a screen.

8. A display apparatus comprising:
a light modulator according to claim 1, which illuminates a liquid crystal panel, and
a display unit to display the projected image on said liquid crystal panel or a screen.

9. A method for driving a light modulator of the type using surface plasmon generated at the interface between a thin metal film and an electro-optical material, comprising two unit devices and a mirror, wherein said two unit devices, each comprising a pair of prisms individually provided with thin metal films at their respective undersides, and said thin metal films being oppositely disposed, and an electro-optical material being sandwiched between said oppositely disposed thin metal films, and said two unit devices are disposed in parallel to each other such that respective surfaces of the individual prisms of said unit devices are in contact with each other so as to ensure the arrangement of said thin metal film in parallel relation to each other, and said mirror is disposed such that the mirror side thereof faces the direction in parallel to said thin metal films and extends along the top of the prism of one unit device on the side thereof not in contact with another unit device, comprising the steps of spatially dividing the incident light into light beams of plurality of wavelengths, and changing the voltage to be applied on said thin metal films.

10. A method for driving a display apparatus of the type comprising a light modulation using surface plasmon generated at the interface between a thin metal film and an electro-optical material, comprising two unit devices and a mirror, wherein said two unit devices, each comprising a pair of prisms individually provided with thin metal films at their respective undersides, and said thin metal films being oppositely disposed, and an electro-optical material being sandwiched between said oppositely disposed thin metal films, and said two unit devices are disposed in parallel to each other such that respective surfaces of the individual prisms of said unit devices are in contact with each other so as to ensure the arrangement of said thin metal films in parallel relation to each other, and said mirror is disposed such that the mirror side thereof faces the direction in parallel to said thin metal films, and extends along the top of the prism of one unit device on the side thereof not in contact with another unit device, comprising driving said display apparatus so as to correct a difference in intensity of optical power on spatial division due to said light modulator.

11. A method for driving a display apparatus comprising a combination of a light modulator of the type using surface plasmon generated at the interface between a thin metal film and an electro-optical material, comprising two unit devices and a mirror, wherein said two unit devices, each comprising a pair of prisms individually provided with thin metal films at their respective undersides, and said thin metal films being oppositely disposed, and an electro-optical material being sandwiched between said oppositely disposed thin metal films, and said two unit devices are disposed in parallel to each other such that respective surfaces of the individual prisms of said unit devices are in contact with each other so as to ensure the arrangement of said thin metal films in parallel relation to each other, and said mirror is disposed such that the mirror side thereof faces the direction in parallel to said thin metal films, and extends along the top of the prism of one unit device on the side thereof not in contact with another unit device, and a source of white light to be incident on said light modulator, comprising driving said display apparatus so as to correct a difference in intensity of optical power on spatial division due to said light modulator.

* * * * *

UNITED STATES PATENT AND TRADEMARK OFFICE
CERTIFICATE OF CORRECTION

PATENT NO.    : 6,504,651 B1
DATED         : January 7, 2003
INVENTOR(S)   : Takatori It is certified that error appears in the above-identified patent and that said Letters Patent is hereby corrected as shown below:

<u>Title page,</u>
Item [30], Foreign Application Priority Data, "11-33585" should be -- 11-133585 --.

Signed and Sealed this

Twenty-third Day of December, 2003

JAMES E. ROGAN
*Director of the United States Patent and Trademark Office*

UNITED STATES PATENT AND TRADEMARK OFFICE
CERTIFICATE OF CORRECTION

| | |
|---|---|
| PATENT NO. | : 6,504,651 B1 |
| APPLICATION NO. | : 09/570354 |
| DATED | : January 7, 2003 |
| INVENTOR(S) | : Ken-ichi Takatori |

It is certified that error appears in the above-identified patent and that said Letters Patent is hereby corrected as shown below:

On the Title Page, Under REFERENCES CITED at Item (56):

Add the following references:
JP03-141338
JP60-117210
JP02-254405

Signed and Sealed this
Fifth Day of July, 2011

David J. Kappos
*Director of the United States Patent and Trademark Office*